United States Patent [19]
Goto

[11] 4,270,843
[45] Jun. 2, 1981

[54] OBJECTIVE FOR VIDEO DISKS

[75] Inventor: Atsuo Goto, Tachikawa, Japan

[73] Assignee: Olympus Optical Co., Ltd., Tokyo, Japan

[21] Appl. No.: 49,411

[22] Filed: Jun. 18, 1979

[30] Foreign Application Priority Data

Jun. 26, 1978 [JP] Japan .................................. 53/77220

[51] Int. Cl.³ .................................................. G02B 9/06
[52] U.S. Cl. ..................................... 350/480; 350/410; 350/414
[58] Field of Search ............ 350/231, 175 E, 175 ML

[56] References Cited

U.S. PATENT DOCUMENTS

| 1,620,339 | 3/1927 | Frederick et al. | 350/231 |
| 3,272,071 | 9/1966 | Zieglar | 350/231 |
| 4,029,398 | 6/1977 | Koizumi | 350/231 |

Primary Examiner—John K. Corbin
Assistant Examiner—Scott J. Sugarman
Attorney, Agent, or Firm—Cushman, Darby & Cushman

[57] ABSTRACT

An objective for video disks comprising a first and second lens components, the first lens component being a positive cemented doublet, the second lens component being a positive meniscus lens, the objective for video disks being very light in weight and having aberrations such as spherical aberration, sine condition, etc. which are corrected favourably.

5 Claims, 5 Drawing Figures

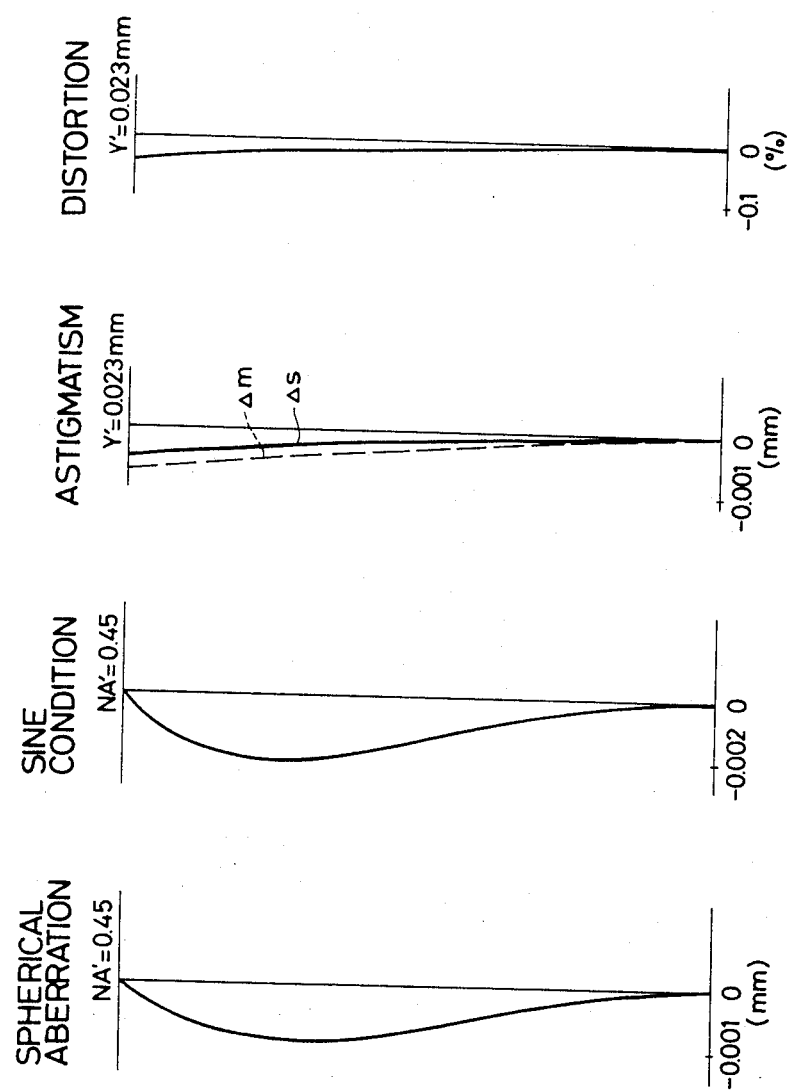

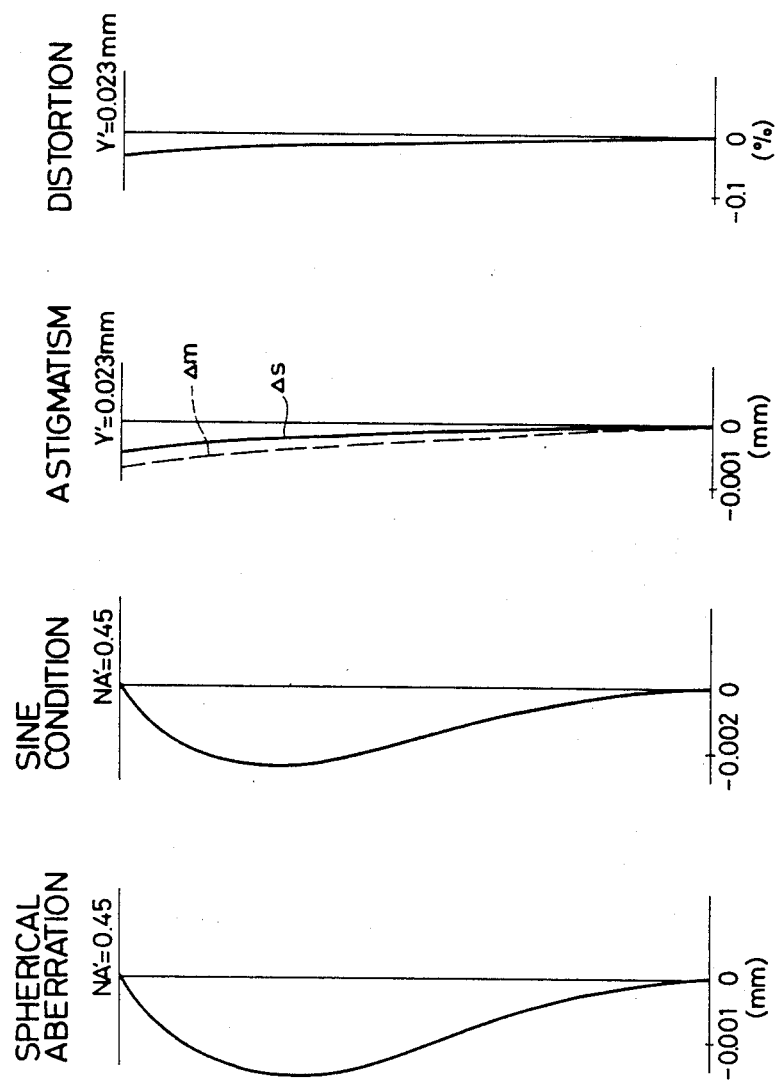

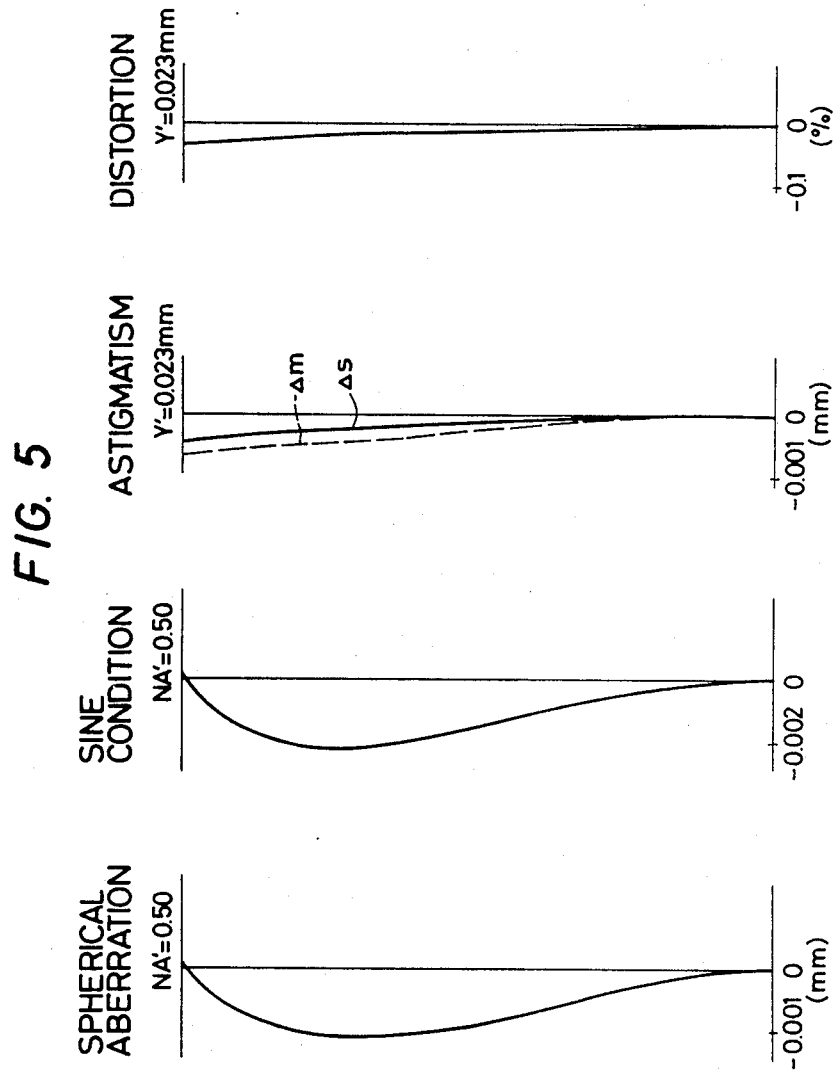

OBJECTIVE FOR VIDEO DISKS

BACKGROUND OF THE INVENTION (a) Field of the Invention

The present invention relates to an objective for video disks.

(b) Description of the Prior Art

As the tracking methods for video disks, there are two main methods. One is to use a galvanomirror and to oscillate the galvanomirror, and the other is to oscillate the objective itself. In the first method, the direction of light beam, which is reflected by the galvanomirror and enters the objective, is changed by oscillating the galvanomirror. Based on the light beam of which direction is changed as above, the objective is adjusted by moving it in the direction parallel with the disk surface so that the optical axis coincides with the position of signal. In the second method, the objective itself is oscillated and the objective is adjusted in the same way as above based on the light beam which passed through the objective. When the second method is adopted out of the tracking methods described in the above, the objective should be small in size and light in weight. However, for known objective for video disks in general, N.A. is about 0.45, outer diameter is about 11 mm and weight is 3 to 5 g. In case of objectives with the above-mentioned large weight, it is not preferable to oscillate the objective itself for the purpose of tracking. However, in case of the afore-mentioned first tracking method employing the galvanomirror, it is necessary to correct offaxial aberrations of objective considerably favourably. Therefore, for known objectives for video disks to be used in the first tracking method employing the galvanomirror, the lens configuration necessarily becomes complicated and the number of lenses becomes large. Moreover, as it is necessary to make the working distance long, it is impossible to make the focal distance very small and, consequently, the outer diameter of lens necessarily becomes large. Due to the above-mentioned reasons, for known objectives for video disks, it has been very difficult to make the weight of objective smaller than the above.

On the other hand, in case of the afore-mentioned second tracking method in which the objective itself is oscillated, it is almost not necessary to correct offaxial aberrations and it is all right when paraxial aberrations are corrected. Therefore, it is possible to select the principal point, airspaces between lenses, etc. of objective comparatively freely and, consequently, it is possible to make the focal length short and other diameter small even when N.A. and working distance of objective are equal to those of known objectives.

SUMMARY OF THE INVENTION

It is, therefore, a primary objective of the present invention to provide an objective for video disks for which N.A. is 0.45 to 0.50, working distance is 2 mm and the weight of objective is about one-fifth of known objectives.

The objective for video disks according to the present invention comprises a first and second lens components. The first lens component is a positive cemented doublet consisting of a positive lens and negative lens while the second lens component is a positive meniscus lens which is concave toward the image side. Besides, the objective for video disks according to the present invention satisfies the following conditions.

(1) $-1.46/f < n_2/n_1 \cdot 1/r_2 < -1.1/f$ (2) $1.7f < (n_3 - 1)r_5 < 2.4f$

In the above-mentioned conditions, reference symbol $r_2$ represents the radius of curvature of the cemented surface of the first lens component, reference symbol $r_5$ represents the radius of curvature of the surface on the image side of the second lens component, reference symbols $n_1$, $n_2$ and $n_3$ respectively represent refractive indices of respective lenses at the wavelength of 632.8 nm, and reference symbol f represents the focal length of the lens system as a whole.

The condition (1) is established for the purpose of correcting spherical aberration, which occurs considerably at the surface on the image side of the first lens component and surface on the image side of the second lens component, by means of the cemented surface of the first lens component. If the value defined by the condition (1) becomes smaller than the lower limit of the condition (1), spherical aberration will be overcorrected. On the contrary, if the value defined by the condition (1) becomes larger than the upper limit, spherical aberration will be undercorrected and, moreover, it becomes impossible to make the working distance long.

The condition (2) is established for the purpose of keeping the sine condition favourably, i.e., for the purpose of correcting coma which occurs at the cemented surface of the first lens component and the other surfaces when the refractive function of the cemented surface is selected in the range defined by the condition (1). If the value defined by the condition (2) becomes smaller than the lower limit of the condition (2), the sine condition will be overcorrected. On the contrary, if the value defined by the condition (2) becomes larger than the upper limit, the sine condition will be undercorrected.

To make the working distance long, it is better to make the refractive indices of positive lenses high. When the refractive indices of positive lenses are made high, it becomes easier to correct spherical aberration. If glass materials with low refractive indices are used for the positive lenses and it is still attempted to make the working distance long, residual spherical aberration at the intermediate N.A. becomes large, the spot diameter of converged light beam becomes large and these are not desirable.

BREIF DESCRIPTION OF THE DRAWINGS

FIG. 1 shows a sectional view of the objective for video disks according to the present invention; and FIGS. 2 through 5 respectively show graphs illustrating aberration curves of the objective according to the present invention.

DETAILED DESCRIPTION OF THE PREFERRED EMBODIMENTS

Now, the preferred embodiments of the objective for video disks according to the present invention explained in the above are shown below.

Embodiment 1

$r_1 = 2.605$ $r_2 = -0.8514$ $r_3 = -2.1127$ $d_1 = 0.4070$  $n_1 = 1.51462$  $\nu_1 = 64.1$ $d_2 = 0.2581$  $n_2 = 1.75607$  $\nu_2 = 26.6$

-continued

| | $d_3 = 0.0233$ | | |
|---|---|---|---|
| $r_4 = 0.7804$ | $d_4 = 0.3256$ | $n_3 = 1.75607$ | $\nu_3 = 26.6$ |
| $r_5 = 2.8579$ | | | |
| | $f = 1$ | $s = 0.5581$ | $t = 0.2558$ |
| | N.A. $= 0.45$ | | |

Embodiment 2

| $r_1 = 2.5324$ | | | |
|---|---|---|---|
| | $d_1 = 0.4070$ | $n_1 = 1.51462$ | $\nu_1 = 64.1$ |
| $r_2 = -0.8796$ | | | |
| | $d_2 = 0.2581$ | $n_2 = 1.77861$ | $\nu_2 = 25.7$ |
| $r_3 = -2.1384$ | | | |
| | $d_3 = 0.0233$ | | |
| $r_4 = 0.7883$ | | | |
| | $d_4 = 0.3256$ | $n_3 = 1.77861$ | $\nu_3 = 25.7$ |
| $r_5 = 2.7431$ | | | |
| | $f = 1$ | $s = 0.5581$ | $t = 0.2558$ |
| | N.A. $= 0.45$ | | |

Embodiment 3

| $r_1 = 2.744$ | | | |
|---|---|---|---|
| | $d_1 = 0.4070$ | $n_1 = 1.51462$ | $\nu_1 = 64.1$ |
| $r_2 = -0.8073$ | | | |
| | $d_2 = 0.2581$ | $n_2 = 1.77861$ | $\nu_2 = 25.7$ |
| $r_3 = -2.0591$ | | | |
| | $d_3 = 0.0233$ | | |
| $r_4 = 0.7685$ | | | |
| | $d_4 = 0.3256$ | $n_3 = 1.77861$ | $\nu_3 = 25.7$ |
| $r_5 = 3.0267$ | | | |
| | $f = 1$ | $s = 0.5581$ | $t = 0.2558$ |
| | N.A. $= 0.45$ | | |

Embodiment 4

| $r_1 = 1.8224$ | | | |
|---|---|---|---|
| | $d_1 = 0.4067$ | $n_1 = 1.51462$ | $\nu_1 = 64.1$ |
| $r_2 = -1.0188$ | | | |
| | $d_2 = 0.2580$ | $n_2 = 1.77861$ | $\nu_2 = 25.7$ |
| $r_3 = -2.7232$ | | | |
| | $d_3 = 0.0232$ | | |
| $r_4 = 0.7560$ | | | |
| | $d_4 = 0.3254$ | $n_3 = 1.77861$ | $\nu_3 = 25.7$ |
| $r_5 = 2.1852$ | | | |
| | $f = 1$ | $s = 0.5113$ | $t = 0.2556$ |
| | N.A. $= 0.50$ | | |

In the above embodiments, reference symbols $r_1$ through $r_5$ respectively represent radii of curvature of respective lens surfaces, reference symbols $d_1$ through $d_4$ respectively represent thicknesses of respective lenses and airspace between lenses, reference symbols $n_1$, $n_2$ $n_3$ respectively represent refractive indices of respective lenses at the wavelength of 632.8 nm, reference symbols $\nu_1$, $\nu_2$ and $\nu_3$ respectively represent Abbe's numbers of respective lenses for d-line, reference symbol f represents the focal length of the lens system as a whole, reference symbol s represents the working distance, reference symbol t represents the thickness of the cover glass and reference symbol N.A. represents the numerical aperture.

Besides, in the above embodiments, the refractive index of the cover glass at the wavelength of 632.8 nm is 1.51.

Figure 1:
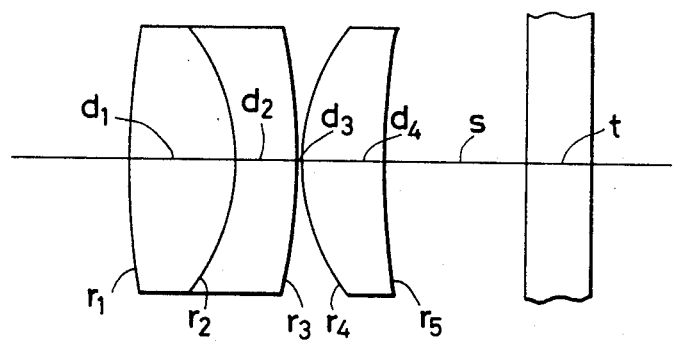
Figure 2:
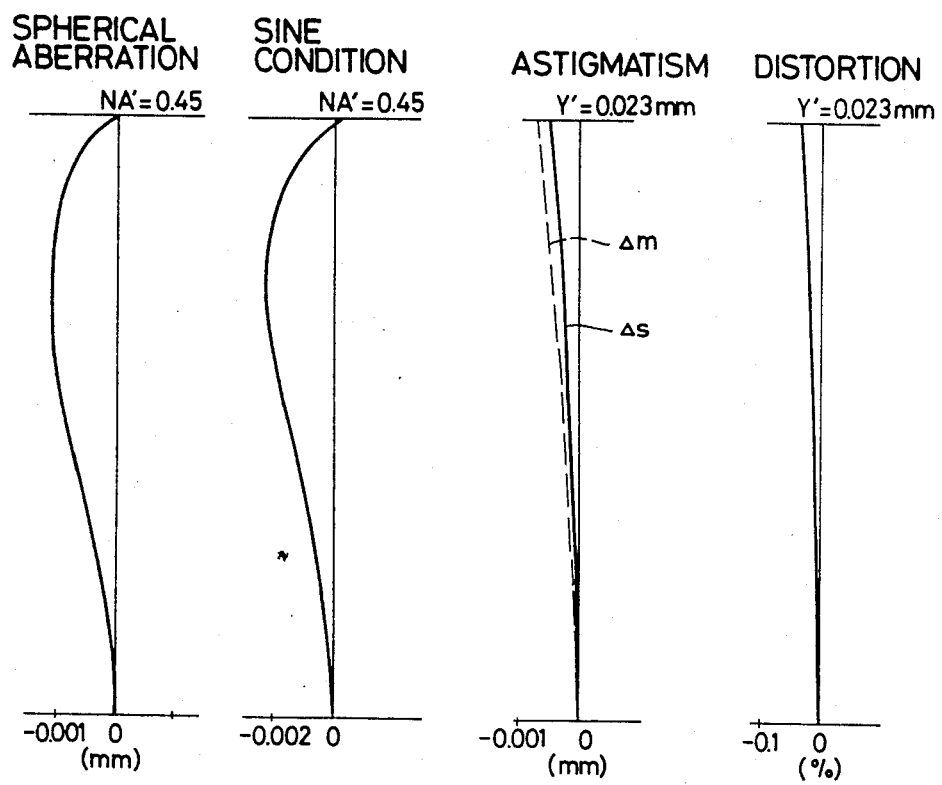

In case of the embodiments shown in the above, the weight of the objective including the lens barrel is 0.5 g when f=4.3 mm, i.e., the weight is very light. Moreover, as it is evident from aberration curves of respective embodiments shown in FIGS. 2 through 5, spherical aberration and sine condition of the objective for video disks according to the present invention are corrected favourably.

I claim:

1. An objective for video disks comprising a first and second lens components, said first lens component being a positive cemented oublet consisting of a positive lens and negative lens, said second lens component bieng a positive meniscus lens arranged concave toward the image side, said objective for video disks satisfying the following conditions:

(1) $-1.46/f < n_2/n_1 \cdot 1/r_2 < -1.1/f$
(2) $1.7f < (n_3-1)r_5 < 2.4f$ wherein reference symbol $r_2$ represents the radius of curvature of the cemented surface of the first lens component, reference symbol $r_5$ represents the radius of curvature of the surface on the image side of the second lens component, reference symbols $n_1$, $n_2$ and $n_3$ respectively represent refractive indices of respective lenses at the wavelength of 632.8 nm, and reference symbol f represents the focal length of the lens system as a whole.

2. An objective for video disks according to claim 1, in which said objective for video disks has the following numerical data:

| $r_1 = 2.605$ | | | |
|---|---|---|---|
| | $d_1 = 0.4070$ | $n_1 = 1.51462$ | $\nu_1 = 64.1$ |
| $r_2 = -0.8514$ | | | |
| | $d_2 = 0.2581$ | $n_2 = 1.75607$ | $\nu_2 = 26.6$ |
| $r_3 = -2.1127$ | | | |
| | $d_3 = 0.0233$ | | |
| $r_4 = 0.7804$ | | | |
| | $d_4 = 0.3256$ | $n_3 = 1.75607$ | $\nu_3 = 26.6$ |
| $r_5 = 2.8579$ | | | |
| | $f = 1$ | $s = 0.5581$ | $t = 0.2558$ |
| | N.A. $= 0.45$ | | | wherein reference symbols $r_1$ through $r_5$ respectively represent radii of curvature of respective lens surfaces, reference symbols $d_1$ through $d_4$ respectively represent thicknesses of respective lenses and airspace between lenses, reference symbols $n_1$, $n_2$ and $n_3$ respectively represent refractive indices of respective lenses at the wavelength of 632.8 nm, reference symbols $\nu_1$, $\nu_2$ and $\nu_3$ respectively represent Abbe's numbers of respective lenses for d-line, reference symbol f represents the focal length of the lens system as a whole, reference symbol s represents the working distance, reference symbol t represents the thickness of the cover glass and reference symbol N.A. represents the numerical aperture.

3. An objective for video disks according to claim 1, in which said objective for video disks has the following numerical data:

| $r_1 = 2.5324$ | | | |
|---|---|---|---|
| | $d_1 = 0.4070$ | $n_1 = 1.51462$ | $\nu_1 = 64.1$ |
| $r_2 = -0.8796$ | | | |
| | $d_2 = 0.2581$ | $n_2 = 1.77861$ | $\nu_2 = 25.7$ |
| $r_3 = -2.1384$ | | | |
| | $d_3 = 0.0233$ | | |
| $r_4 = 0.7883$ | | | |
| | $d_4 = 0.3256$ | $n_3 = 1.77861$ | $\nu_3 = 25.7$ |
| $r_5 = 2.7431$ | | | |
| | $f = 1$ | $s = 0.5581$ | $t = 0.2558$ |
| | N.A. $= 0.45$ | | | wherein reference symbols $r_1$ through $r_5$ respectively represent radii of curvature of respective lens surfaces, reference symbols $d_1$ through $d_4$ respectively represent thicknesses of respective lenses and airspaces between lenses, reference symbols $n_1$, $n_2$ and $n_3$ respectively represent refractive indices of respective lenses at the wavelength of 632.8 nm, reference symbols $\nu_1$, $\nu_2$ and $\nu_3$ respectively represent Abbe's numbers of respective lenses for d-line, reference symbol f represents the focal length of the lens system as a whole, reference symbol s represents the working distance, reference symbol t represents the thickness of the cover glass and reference symbol N.A. represents the numerical aperture.

4. An objective for video disks according to claim 1, in which said objective for video disks has the following numerical data:

| | | | |
|---|---|---|---|
| $r_1 = 2.744$ | | | |
| | $d_1 = 0.4070$ | $n_1 = 1.51462$ | $\nu_1 = 64.1$ |
| $r_2 = -0.8073$ | | | |
| | $d_2 = 0.2581$ | $n_2 = 1.77861$ | $\nu_2 = 25.7$ |
| $r_3 = -2.0591$ | | | |
| | $d_3 = 0.0233$ | | |
| $r_4 = 0.7685$ | | | |
| | $d_4 = 0.3256$ | $n_3 = 1.77861$ | $\nu_3 = 25.7$ |
| $r_5 = 3.0267$ | | | |
| | $f = 1$ | $s = 0.5581$ | $t = 0.2558$ |
| | N.A. $= 0.45$ | | | wherein reference symbols $r_1$ through $r_5$ respectively represent radii of curvature of respective lens surfaces, reference symbols $d_1$ through $d_4$ respectively represent thickeness of respective lenses and airspace between lenses, reference symbols $n_1$, $n_2$ and $n_3$ respectively represent refractive indices of respective lenses at the wavelength of 632.8 nm, reference symbols $\nu_1$, $\nu_2$ and $\nu_3$ respectively represent Abbe's numbers of respective lenses for d-line, reference symbol f represents the focal length of the lens system as a whole, reference symbol s represents the working distance, reference symbol t represents the thickness of the cover glass and reference symbol N.A. represents the numerical aperture.

5. An objective for video disks according to claim 1, in which said objective for video disks has the following numerical data:

| | | | |
|---|---|---|---|
| $r_1 = 1.8224$ | | | |
| | $d_1 = 0.4067$ | $n_1 = 1.51462$ | $\nu_1 = 64.1$ |
| $r_2 = -1.0188$ | | | |
| | $d_2 = 0.2580$ | $n_2 = 1.77861$ | $\nu_2 = 25.7$ |
| $r_3 = -2.7232$ | | | |
| | $d_3 = 0.0232$ | | |
| $r_4 = 0.7560$ | | | |
| | $d_4 = 0.3254$ | $n_3 = 1.77861$ | $\nu_3 = 25.7$ |
| $r_5 = 2.1852$ | | | |
| | $f = 1$ | $s = 0.5113$ | $t = 0.2556$ |
| | N.A. $= 0.50$ | | | wherein reference symbols $r_1$ through $r_5$ respectively represent radii of curvature of respective lens surfaces, reference symbols $d_1$ through $d_4$ respectively represent thicknesses of respective lenses and airspace between lenses, reference symbols $n_1$, $n_2$ and $n_3$ respectively represent refractive indices of respective lenses at the wavelength of 632.8 nm, reference symbols $\nu_1$, $\nu_2$ and $\nu_3$ respectively represent Abbe's numbers of respective lenses for d-line, reference symbol f represents the focal length of the lens system as a whole, reference symbol s represents the working distance, reference symbol t represents the thickness of the cover glass and reference symbol N.A. represents the numerical aperture.

* * * * *